(12) United States Patent
Kim et al.

(10) Patent No.: US 7,981,319 B2
(45) Date of Patent: Jul. 19, 2011

(54) NON-AQUEOUS LIQUID COMPOSITIONS COMPRISING ION EXCHANGE POLYMERS

(75) Inventors: Yu Seung Kim, Los Alamos, NM (US); Kwan-Soo Lee, Blacksburg, VA (US); Tommy Q. T. Rockward, Rio Rancho, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 36 days.

(21) Appl. No.: 12/383,279

(22) Filed: Mar. 19, 2009

(65) Prior Publication Data
US 2010/0237278 A1 Sep. 23, 2010

(51) Int. Cl.
*C09K 3/00* (2006.01)
*H01B 1/00* (2006.01)
*H01B 1/12* (2006.01)
*H01B 1/02* (2006.01)
*H01B 1/22* (2006.01)
*C08F 2/26* (2006.01)
*C08K 5/01* (2006.01)
*C08K 5/41* (2006.01)

(52) U.S. Cl. .................... 252/182.3; 252/500; 252/514; 524/745

(58) Field of Classification Search ................ 252/182.3, 252/500, 514; 524/745
See application file for complete search history.

(56) References Cited

U.S. PATENT DOCUMENTS

| 4,433,082 | A | 2/1984 | Grot |
| 5,211,984 | A | 5/1993 | Wilson |
| 6,150,426 | A | 11/2000 | Curtin et al. |
| 6,156,449 | A * | 12/2000 | Zuber et al. ..................... 429/42 |
| 6,309,772 | B1 | 10/2001 | Zuber et al. |
| 6,552,093 | B1 | 4/2003 | Curtin et al. |
| 6,702,945 | B2 | 3/2004 | Saxton et al. |
| 7,166,685 | B2 | 1/2007 | Curtin et al. |
| 2004/0009368 | A1 * | 1/2004 | Otani et al. .................. 428/690 |
| 2005/0153078 | A1 * | 7/2005 | Bentley et al. ............. 427/443.1 |
| 2005/0224765 | A1 * | 10/2005 | Hsu et al. ..................... 252/500 |
| 2006/0036064 | A1 | 2/2006 | McGrath et al. |
| 2006/0110631 | A1 | 5/2006 | Olmeijer et al. |
| 2006/0127729 | A1 | 6/2006 | Roscoe et al. |
| 2006/0234101 | A1 | 10/2006 | Kaneko |
| 2006/0280983 | A1 | 12/2006 | Kaneko |
| 2007/0099052 | A1 | 5/2007 | Frey et al. |
| 2007/0264551 | A1 | 11/2007 | Matsunaga |
| 2008/0214719 | A1 | 9/2008 | Khvorost et al. |

OTHER PUBLICATIONS

Gebel, G et al. Macromolecules, 20 (6), 1425-28 (1987).
Moore et al., Anal. Chem. 1986,58, 2569-2570 (1986.

* cited by examiner

*Primary Examiner* — Lorna M Douyon
*Assistant Examiner* — Tanisha Diggs
(74) *Attorney, Agent, or Firm* — Juliet A. Jones; Samuel L. Borkowsky; Bruce H. Cottrell

(57) ABSTRACT

Compositions, and methods of making thereof, comprising from about 1% to about 5% of a perfluorinated sulfonic acid ionomer or a hydrocarbon-based ionomer; and from about 95% to about 99% of a solvent, said solvent consisting essentially of a polyol; wherein said composition is substantially free of water and wherein said ionomer is uniformly dispersed in said solvent.

8 Claims, 4 Drawing Sheets

(A)

(B)

NON-AQUEOUS LIQUID COMPOSITIONS COMPRISING ION EXCHANGE POLYMERS

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD OF THE INVENTION

The present invention relates to non-aqueous compositions suitable for use with perfluorinated sulfonic acid and hydrocarbon-based ionomers, and methods of making said non-aqueous compositions.

BACKGROUND OF THE INVENTION

Perfluorinated sulfonic acids (PFSAs) have excellent proton conductivity and good thermal/oxidative stability. Therefore, PFSAs are widely used in electrodialysis and chloroalkali applications, as well as electrochemical devices such as sensors, capacitors, and fuel cells. However, PFSAs have been found to be insoluble in any single solvent, and thus are dispersive only in a mixed solvent system. Therefore, in applications such as fuel cell electrodes, water/alcohol mixtures have generally been used as PFSA dispersing agents. The current dispersion process requires a relatively high processing temperature (>200° C.), high pressure (>500 psi) and long processing time (about 18 hours) in order to ensure sufficient dispersion. In addition, the use of a closed system at this high pressure is required due to the high vapor pressure of water and/or alcohol. High temperature processing often raises concerns about degradation: crosslinking reactions, isomerization, and ether formation may occur in the acid form of perfluorinated ionomers or with alcohols. Poor dispersion or a brittle nature of the dispersion cast film may occur due to the difference in rates of evaporation between the solvents, which may be a significant problem for film fabrication or electrode performance. Typical solutions for these problems are heat treatment of membrane or electrode or adding a small amount organic polar solvent.

Hydrocarbon-based ionomers have recently emerged as suitable alternatives for electrochemical applications. This category of polymers includes sulfonated poly(arylene ether sulfone), sulfonated poly(arylene ether ketone), sulfonated poly(arylene ether nitrile), sulfonated polyphenylene and sulfonated polyimide. Hydrocarbon-based ionomers have greater thermal/oxidative stability than PFSAs and lower water transport properties. The greater thermal stability enhances the fuel cell durability under more strenuous fuel cell operating conditions. The lower water transport properties of hydrocarbon-based ionomers may be advantageous under high temperature/low relative humidity fuel cell operating conditions, as the lower water transport properties can increase water back-diffusion to the membrane and increase membrane hydration, which in turn lowers the cell resistance. Unlike PFSAs, these copolymers are amorphous in nature which prevents forming a tough film after thermal treatment when water/alcohol mixtures are used. The poor mechanical stability results in poor electrode performance, which is inferior to electrodes comprising a PFSA ionomer.

Also unlike the PFSAs, hydrocarbon-based sulfonated polymers are readily dissolved in aprotic solvents such as dimethylformamide (DMF), dimethylacetamide (DMAc), N-methylpyrrolidone (NMP) or dimethylsulfoxide (DMSO). Although the hydrocarbon membranes formed with aprotic solvents are tough and ductile, solid electrodes formed from the polymer dispersion exhibited inferior performance as compared to a PFSA bonded electrode. It is believed that this inferior performance is due to the fact that electrodes made with aprotic solvents have a less porous structure, which in turn adversely impacts fuel cell performance. In addition, undesirable catalyst poisoning by the residual aprotic solvent may also occur.

Therefore, a need exists for more mechanically stable electrodes and for simpler, less costly methods of making such electrodes, which can be used to develop new electro-chemical devices. A further need exists, therefore, for solvents which are suitable for use with both PFSA and hydrocarbon-based sulfonated polymers, and which result in stable and durable fuel cells having superior performance.

SUMMARY OF THE INVENTION

It has unexpectedly been found that it is possible to disperse PFSA and hydrocarbon-based ionomers in essentially neat solutions of certain polyols, at a temperature below the boiling point of the solvent. For example, polyols such as butanediol, propylene glycol or glycerol can be used for dispersing PFSA (EW=1100 or lower) at about 200° C. at ambient pressure and for a processing time less than 3 hours. This has not been thought possible, as previous practice and references all taught that water is necessary to disperse the ionomers, which requires high temperatures and long processing times. Thus, the present invention resolves many problems associated with the current state of the art water based dispersion techniques. First, the liquid dispersion process can be completed in an open, unpressurized vessel. Additionally, a polymer dispersion can be obtained at relatively low processing temperature (180-250° C.). The low processing temperature prevents undesired side reactions such as isomerization, cross-linking, ether formation, and aldehyde formation. Additionally, dispersion in non-aqueous alcohol solutions produces a more robust film, whereas an aqueous dispersion typically results in a mechanically brittle film. For PFSA membranes, robust membranes can be obtained from water/alcohol dispersion by thermal treatment at 140° C. or higher, or by adding a high boiling point solvent. For hydrocarbon membranes, a tough film cannot be obtained by heat treatment, since no crystalline phase is formed from thermal treatment. The mechanical instability of the hydrocarbon ionomer has been one of the barriers to make durable electrode. Using a polyol dispersing agent, robust PFSA and hydrocarbon-based membranes can be obtained without further processing. Finally, the present invention provides a means for maintaining a constant composition of the dispersing agent. In aqueous dispersing agents, the ratio of water to alcohol varies during the process as a result of different evaporation rates of each component. This generates complex kinetics and makes it difficult to control polymer morphology. Using a polyol as a solvent facilitates optimization and control of the ionomer structure, and results in a uniform dispersion. This, in turn, results in better electrode performance, stability and durability, with both PFSA and hydrocarbon-based ionomers.

The use of polyols, such as glycerol and other diols and triol, has been suggested previously in the context of any number of solvents. However, conventional wisdom has been to utilize polyols in combination with water (either by aqueous mixed solvent system or re-dispersion after processing with an aqueous solvent system), and the current state of the art is to use aqueous, mixed-solvent systems. Extensive experimental work has revealed, however, that whereas most known solvents are unsuitable for use without the addition of water, some solvents surprisingly result in formation of robust electrodes and membrane electrode assemblies when used in a non-aqueous solvent system. There does not appear to be a means of theoretically predicting which solvents will be useful.

The following describe some non-limiting embodiments of the present invention.

According to a first embodiment of the present invention, a composition is provided comprising from about 1% to about 5% of a perfluorinated sulfonic acid ionomer; and from about 95% to about 99% of a solvent, said solvent consisting essentially of a polyol; wherein said composition is substantially free of water and wherein said ionomer is uniformly dispersed in said solvent.

According to another embodiment of the present invention, a composition is provided comprising from about 1% to about 5% of a hydrocarbon-based ionomer; and from about 95% to about 99% of a solvent, said solvent consisting essentially of a polyol; wherein said composition is substantially free of water and wherein said ionomer is uniformly dispersed in said solvent.

According to yet another embodiment of the present invention, a method of making a polymer dispersion suitable for use in a fuel cell is provided, comprising providing a composition comprising from about 1% to about 5% of an ionomer and from about 95% to about 99% of a solvent, said solvent consisting essentially of a polyol, wherein said composition is substantially free of water and wherein said ionomer is uniformly dispersed in said solvent; and, heating the composition to a temperature of from about 140° C. to about 290° C. at ambient pressure for a period of 3 hours or less.

BRIEF DESCRIPTION OF THE DRAWINGS

In FIG. 2(a), the cathode was prepared from a dispersion using water/isopropanol as the solvent. In FIG. 2(b), the cathode was prepared from a dispersion using glycerol as the solvent. Membrane: NAFION™ 212, anode/cathode loadings are 0.2 mg Pt/cm$^2$ of 20 wt % Pt/C catalyst; anode/cathode pressures==30/30 psi, $T_{cell}$=80° C., anode/cathode $T_{humidifiers}$=105/80° C.; potential cycling from 0.6 to 1.0 V.

DETAILED DESCRIPTION OF THE INVENTION

Figure 1:
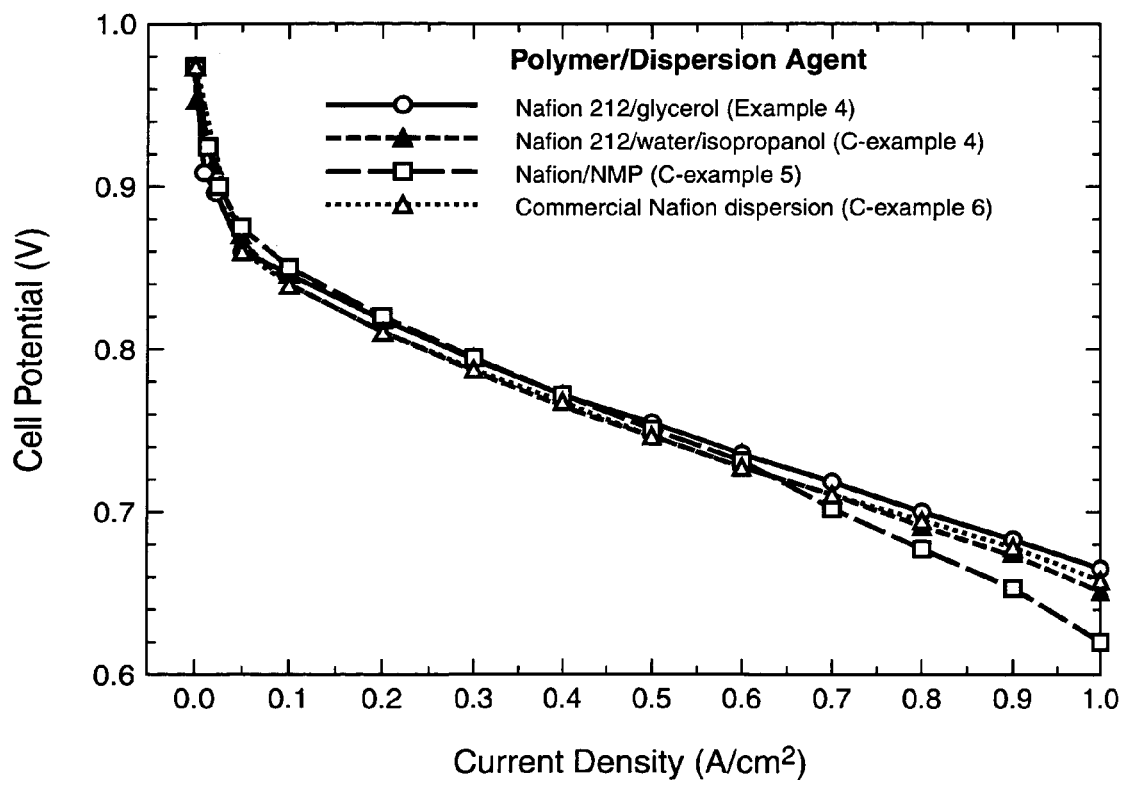
FIG. 1 depicts $H_2$/air fuel cell performance, as a function of cell potential in volts (y-axis) vs. current density in A/cm$^2$ (x-axis), of fuel cells having membrane electrode assemblies (MEA)s prepared from a NAFION™ dispersion in glycerol, water/isopropanol, NMP, and a commercially-available NAFION™ dispersion. Membrane: NAFION™ 212, anode/cathode loadings are 0.2 mg Pt/cm$^2$ of 20 wt % Pt/C catalyst; anode/cathode pressures=30/30 psi, $T_{cell}$=80° C., anode/cathode $T_{humidifiers}$=105/80° C.

The present invention describes compositions useful for formation of uniformly-dispersed electrodes, which in turn are useful as a component of membrane-electrode assemblies for, e.g., fuel cells, sensors and capacitors. The compositions also may be useful for repairing or recovering perfluorinated ion exchange membranes, and for film casting processes.

In all embodiments of the present invention, all percentages are by weight of the total composition, unless specifically stated otherwise. All ratios are weight ratios, unless specifically stated otherwise. All ranges are inclusive and combinable. All numerical amounts are understood to be modified by the word "about" unless otherwise specifically indicated. All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

"Equivalent weight," (EW) means molecular weight per cation, i.e., the reciprocal value of the cation exchange capacity of a polymer, and is understood to mean the weight of the polymer in acid form required to neutralize one equivalent of NaOH.

"Polyol," as used herein, means a compound having at least two —OH groups, and may include sugar alcohols, also known as polyhydric alcohols.

"Uniformly dispersed," as used herein, means that after heating for a suitable time as specified herein, no residual solid polymer remains visible to the unaided eye.

"Substantially free from water," as used herein, means that any water that is present is incidentally present (for example, due to environmental conditions) and comprises less than 1% of the composition.

"Consisting essentially of," as used herein, means that the solvent comprises at least 99% by weight of a polyol, and is free from additional solvents or additives that may negatively impact ionomer dispersion.

The compositions of the present invention may comprise from about 1% to about 5% of a perfluorinated sulfonic acid ionomer. These ionomers are commercially available, a typical example of which is sold by E.I. Dupont de Nemours & Co. under the trade name NAFION™. In one embodiment, the PFSA is a salt, wherein the salt may comprise a cation selected from the group consisting of sodium, potassium, lithium, iron, cesium, magnesium, cesium, tetrabutyl ammonium, tetramethyl ammonium, tetrapropyl ammonium, tetraethyl ammonium, and combinations thereof. In an alternative embodiment, the membrane is a protonated PFSA membrane (i.e., "hydrogenated" or "acid form"), in which any counterions that are present are H$^+$. The perfluorinated sulfonic acid ionomer may have an equivalent weight of 1100 or less, alternatively may have an equivalent weight of from about 600 to about 1100, and alternatively from about 1000 to about 1100.

In yet another embodiment, compositions of the present invention may comprise from about 1% to about 5% of a hydrocarbon-based ionomer (i.e., is "hydrocarbon-based"). The hydrocarbon-based ionomers of the present invention may comprise poly(arylene) materials such poly(arylene ether sulfone), poly(arylene ether ketone), polyimide, poly (phenylene), poly(phosphine oxide), poly(nitrile), derivatives of any of the foregoing, and combinations thereof. In yet another embodiment, the hydrocarbon-based ionomer is a salt, wherein the salt may comprise a cation selected from the group consisting of sodium, potassium, lithium, iron, cesium, magnesium, cesium, tetrabutyl ammonium, tetramethyl ammonium, tetrapropyl ammonium, tetraethyl ammonium, and combinations thereof. In an alternative embodiment, the membrane is a protonated hydrocarbon-based ionomer (i.e., "hydrogenated" or "acid form"), in which any counterions that are present are $H^+$. The hydrocarbon-based ionomer may have an equivalent weight of 1600 or less, alternatively from about 300 to about 1600, and alternatively from about 550 to about 1600.

The compositions of the present invention further comprise from about 95% to about 99% of a non-aqueous solvent, meaning that the solvent is substantially free of water. The solvent uniformly disperses the ionomer, and thus is suitable for producing high quality electrodes and membrane electrode assemblies. The solvent must have sufficient dispersing capability to uniformly disperse the ionomer at a temperature below the boiling point of the solvent. The solvent of the present invention consists essentially of one or more polyols. Low-boiling point alcohols, such as methanol, ethanol, propanol or butanol, are not suitable due to their relatively low boiling points. Polar, aprotic solvents also are undesirable in the present invention, as the use of such solvents results in ionomer structures having too high of a density. In addition, residual polar, aprotic solvent may poison the surface of electrocatalysts. In one embodiment, the solvent of the present invention consists essentially of a single polyol (i.e., is a "single-component solvent"). A single-component solvent provides the advantage of being able to more easily optimize the resulting ionomer structure and to more easily recover the solvent.

Suitable examples of polyols include glycerol, ethylene glycol, propylene glycol, butanediols including 1,2-butanediol, 1,3-butanediol, 1,4-butanediol, butanetriols including 1,2,4-butanetriol, pentanediols including 1,5-pentanediol, hexanediols, hexanetriols, and combinations thereof. In a preferred embodiment, the solvent is glycerol. When the ionomer is a PFSA salt, the solvent may include ethylene glycol, propylene glycol, 1,2-butanediol, 1,3-butanediol, 1-4 butanediol, glycerol, 1,2,4-butanetriol, and combinations thereof. When the ionomer is an acid form of a PFSA ionomer, the solvent may include 1,5-pentanediol, propylene glycol, ethylene glycol, glycerol, and combinations thereof. When the ionomer is hydrocarbon-based, the solvent may include ethylene glycol, propylene glycol, glycerol, and combinations thereof.

The compositions may comprise an inorganic base, useful for converting the ionomer to the corresponding salt from. In one embodiment the inorganic bases are sodium hydroxide and tetrabutyl ammonium hydroxide.

The present invention further describes methods of making a polymer dispersion suitable for use, for example, in a fuel cell membrane or in a catalyst ink formulation. The method comprises providing a composition as described herein, and heating the composition to a desirable temperature. The temperature should be below the boiling point of the solvent or combination of solvents, and sufficient to uniformly disperse the ionomer. The temperature will vary and depend upon the type of ionomer and the type of solvent, but is from about 140° C. to about 290° C., and alternatively is from about 140° C. to about 210° C.

The composition is heated to a suitable temperature at ambient pressure for a period of time suitable to result in a uniformly-dispersed polymer. The length of time will vary and depend upon the type of ionomer and the type of solvent, and is for a period of three hours or less, alternatively is about one hour or less, and alternatively is from about 0.3 hours to about three hours, and alternatively is about 1 hour.

The method of the present invention does not require the steps of dispersing the ionomer in a solvent system and subsequently freeze-drying to remove any undesired solvent. Rather, the method of the present invention has the advantage of dispersing the ionomer directly into a non-aqueous solvent.

The resulting dispersion may be used to form an electrode by means that would be well-known to one of skill in the art. The electrode may form part of a membrane electrode assembly for a fuel cell, may be used in sensors, capacitors, or other suitable applications.

EXAMPLES

Examples 1 and 2 describe the preparation of PFSA dispersion in a non-aqueous dispersing agent.

Example 1

21.57 g of a dispersing agent, 0.54 g of perfluorinated sulfonic acid (EW=1000-1100) with the functional groups having been hydrolyzed to $SO_3Na$ form (solid content 2.5 wt. %), and the polymer itself being in the form of membrane having a thickness of about 50 micrometer, were placed in a 60 ml vial. The vial was heated in a convection oven the temperatures shown in Table 1. Table 1 shows the dispersion state after the heat treatment.

TABLE 1

| | | | PFSA dispersion Na+ form | | | | |
|---|---|---|---|---|---|---|---|
| No. | EW | Dispersing medium | Type of dispersion agent | Boiling point (° C.) | % solid | Processing temp./time (° C./hr) | Dispersion |
| 1-1 | 1000 | Methanol | Alcohol | 65 | 2.5 | 50/3 | − |
| 1-2 | 1000 | Ethanol | Alcohol | 78 | 2.5 | 50/3 | − |

TABLE 1-continued

PFSA dispersion Na+ form

| No. | EW | Dispersing medium | Type of dispersion agent | Boiling point (° C.) | % solid | Processing temp./time (° C./hr) | Dispersion |
|---|---|---|---|---|---|---|---|
| 1-3 | 1000 | 1-propanol | Alcohol | 97 | 2.5 | 80/3 | − |
| 1-4 | 1000 | 2-propanol | Alcohol | 82 | 2.5 | 60/3 | − |
| 1-5 | 1000 | Ethylene glycol | Alcohol | 197 | 2.5 | 180/1 | + |
| 1-6 | 1100 | | | | 2.5 | 190/3 | − |
| 1-7 | 1000 | Propylene glycol | Alcohol | 188 | 2.5 | 170/1 | + |
| 1-8 | 1000 | 1,2 butanediol | Alcohol | 193 | 2.5 | 170/2 | + |
| 1-9 | 1000 | 1,3 butanediol | Alcohol | 207 | 2.5 | 170/0.3 | + |
| 1-10 | 1000 | 2,3 butanediol | Alcohol | 183 | 2.5 | 180/3 | − |
| 1-11 | 1000 | 1,4 butanediol | Alcohol | 230 | 5 | 200/0.5 | + |
| 1-12 | 1100 | | | | 2.5 | 220/3 | − |
| 1-13 | 1000 | 1,5 pentanediol | Alcohol | 242 | 2.5 | 220/3 | − |
| 1-14 | 1000 | Propane-1,2,3-triol (Glycerol) | Alcohol | 290 | 2.5 | 210/2 | + |
| 1-15 | 1100 | | | | 2.5 | 250/3 | + |
| 1-16 | 1000 | 1,2,4 butanetriol | Alcohol | ~290 | 2.5 | 200/0.3 | + |
| 1-17 | 1000 | DMSO | Aprotic polar | 189 | 2.5 | 100/1 | + |
| 1-18 | 1100 | | | | 2.5 | 180/3 | − |
| 1-19 | 1000 | NMP | Aprotic polar | 203 | 2.5 | 100/1 | + |
| 1-20 | 1100 | | | | 2.5 | 180/3 | + |
| 1-21 | 1000 | DMAc | Aprotic polar | 165 | 2.5 | 100/1 | + |

"+" means that a clear liquid (i.e., uniformly dispersed) composition (yellowish brown in color) was obtained. No residual solid polymer remained.
"−" means that residual polymer membrane remained in the dispersion after heat treatment.

Comparative Example 1

64 g water, 96 g of isopropanol, 4 g of perfluorinated sulfonic acid (EW=1000) with the functional groups having been hydrolyzed to —SO$_3$Na form (solid content 2.5 wt. %), and the polymer itself being in the form of membrane having a thickness of about 50 micrometer) were placed in 200 ml closed vessel. The vessel was heated in a heat mantle at 210° C. for 3 hours. The internal vessel pressure was about 500 psi. A clear liquid composition (transparent dispersion) was obtained without residual solid polymer.

A glycerol dispersion (1-14) and water/iso-propanol dispersion (comparative example 1) were poured onto a clean glass and dried at 120° C. in a convection oven for 60 h. The resulting membrane prepared from glycerol was tough, whereas the membrane from water/isopropanol was brittle. Atomic force microscopy shows that membrane from glycerol exhibited less phase separation and a denser structure, whereas the membrane from water/isopropanol dispersion was highly phase-separated.

Example 2

21.57 g of a dispersing medium, 0.54 g of perfluorinated sulfonic acid (EW=1000-1100) with the functional groups having been hydrolyzed to —SO$_3$H form (solid content 2.5 wt. %), and the polymer itself being in the form of membrane having a thickness of about 50 micrometer, were placed in a 60 ml vial. The vial was heated in a convection oven at the temperatures shown in Table 2. Dispersions from 1,4 butanediol and 1,2,4 butanetriol had white bubbles on top of the clear dispersion. $^1$H NMR indicated that those dispersion with bubbles contained ether compounds, likely due to a side reaction. Table 2 shows the dispersion state after the heat treatment.

TABLE 2

PFSA dispersion H+ form

| No. | EW | Dispersing medium | Type of dispersion agent | Boiling point (° C.) | % solid | Processing temp./time (° C./hr) | Dispersion |
|---|---|---|---|---|---|---|---|
| 2-1 | 1000 | 1,4 butanediol | Alcohol | 230 | 2.5 | 170/1 | + (side reaction) |
| 2-2 | 1100 | | | | | 190/1 | + (side reaction) |
| 2-3 | 1100 | 1,2,4 butanetriol | Alcohol | 290 | 5 | 190/1 | + (side reaction) |
| 2-4 | 1000 | 1,5 pentanediol | Alcohol | 242 | 2.5 | 170/1 | + |
| 2-5 | 1000 | Propylene glycol | Alcohol | 188 | 2.5 | 170/1 | + |
| 2-6 | 1000 | Ethylene glycol | Alcohol | 197 | 2.5 | 170/1 | + |
| 2-7 | 1000 | glycerol | Alcohol | 290 | 2.5 | 200/1 | + |

Example 3 and comparative example 2-4 show fuel cell performance of PFSA based electrodes. The electrodes are prepared from different polymer dispersions as described in Example 1. Polarization curves were obtained to evaluate the electrode performance.

Example 3

The catalyst dispersion for thin film electrodes is prepared by thoroughly mixing the catalyst (20 wt % Pt on carbon supplied by Alfa AISER, Ward Hill, Mass.) and the polymer dispersion. 2.5 wt % NAFION™ dispersions were prepared from glycerol as described from Example 1 (1-14), respectively.

The following procedure may be used:

1 g of 2.5 wt. % NAFION™ dispersion in glycerol (prepared from Example 1-14) was mixed with 1 g of water, and 0.0625 g Pt/C in a small vial. An amount of TBAOH equal to a molar equivalent of the ionomer is added to convert the ionomer to a thermoplastic TBA+ form. The mixture is agitated with ultrasound to uniformly disperse the supported catalyst in the catalyst ink.

Comparative Example 2

A procedure similar to Example 3 was used except that 1 g of 2.5 wt. % NAFION™ dispersion in water/isopropanol (prepared from Comparative example 1) was mixed with 0.0625 g Pt/C in a small vial.

Comparative Example 3

A procedure similar to Example 3 was used except that 1 g of 2.5 wt. % NAFION™ dispersion in NMP (prepared from Example 1 (1-19)) was mixed with 0.0625 g Pt/C in a small vial.

Comparative Example 4

A procedure similar to Example 3 was used except that 0.5 g of 5 wt. % commercial NAFION™dispersion (Solution Technologies, INC, Mendenhall, Pa.) was mixed with 1 g of glycerol and 0.0625 g Pt/C in a small vial.

A Na$^+$NAFION™ membrane is provided by soaking a protonated membrane in a solution of 1M NaOH, followed by rinsing and drying. The ink is applied to a Teflon transfer substrate by painting, and the substrate is baked in an oven at 140° C. The painting procedure is repeated until the catalyst loading reaches 0.2 mg/cm$^2$, and then further is dried for at least 5 hours. For the anode catalyst layer, a catalyst ink prepared from comparative example 4. For the cathode catalyst layer, catalyst inks prepared from Example 3, and comparative examples 2, 3 and 4 were used. The Na$^+$ form NAFION™ is hot pressed between two catalyst layers at 210° C., 10000 kPa for 6 minutes. The assembly is cooled, and then the release blank is peeled from the MEA, leaving the electrode adhered to the membrane. The dried assembly is lightly boiled in 0.5 M H$_2$SO$_4$ for 90 minutes and rinsed in boiling, deionized water for 90 minutes. The assembly is dried at 75° C. under vacuum.

FIG. 1 graphically depicts the voltage vs. current density curves for fuel cells having MEAs prepared from glycerol, water/isopropanol, NMP, and commercial NAFION™ dispersion. It is apparent that the electrode prepared from a glycerol dispersion has equivalent performance to the electrode prepared from water/isopropanol dispersion. Electrodes prepared from NMP and commercial NAFION™ dispersion showed inferior performance to the electrode prepared from glycerol. This result indicated that fuel cell performance using glycerol dispersion is at least equivalent to that using water based dispersion.

Example 4 shows the effect of PFSA dispersion on fuel cell durability of NAFION™ bonded electrodes. The cathode electrode was prepared from example 3 and comparative example 2 and the cathode durability was compared.

Example 4

Figure 2:
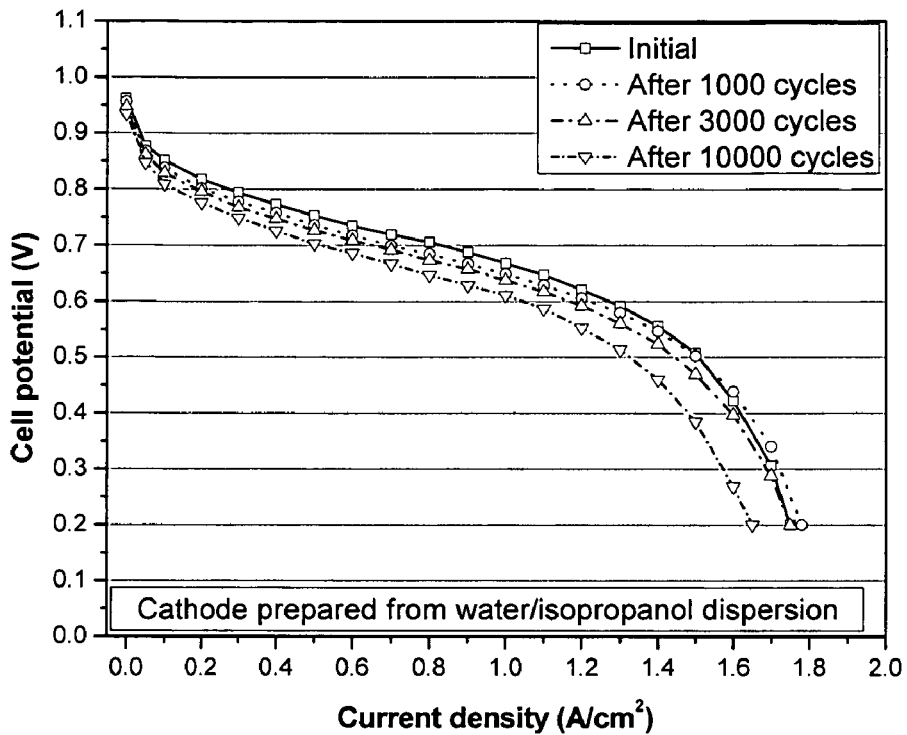
FIGS. 2(a) and 2(b) depict $H_2$/air fuel cell durability as a function of the number of potential cycles in the presence of hydrogen and nitrogen.
Figure 2:
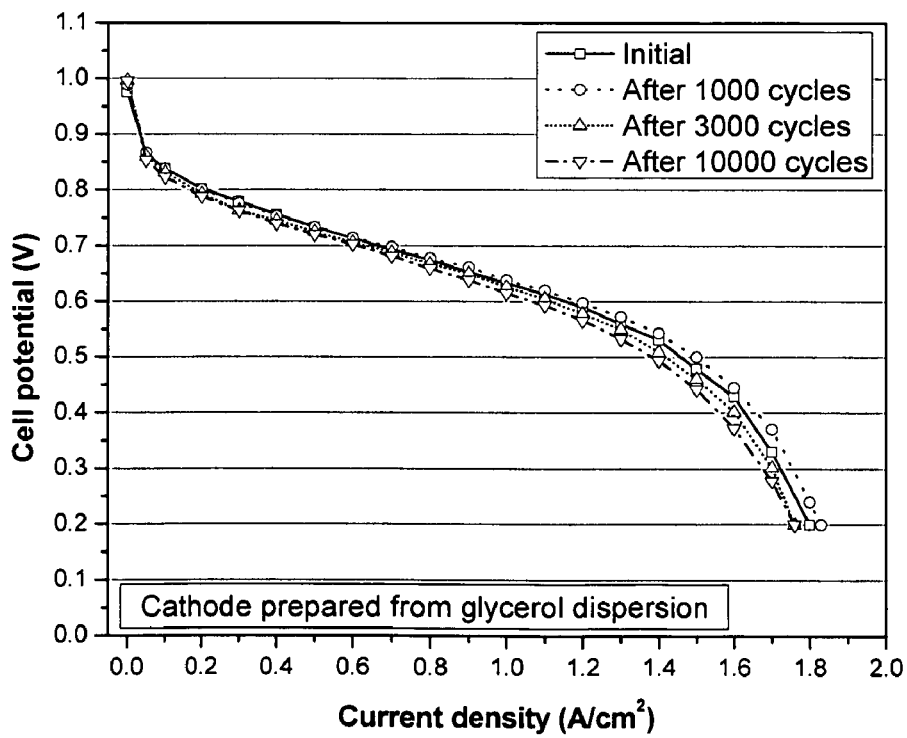

In order to evaluate fuel cell durability, a potential cycling test was performed. Potential cycling is a widely used technique to study the acceleration of degradation in fuel cell performance and is described in Rod L. Borup et al., J. Power Sources, 163, 76-81 (2006). In this technique the oxidant is replaced with nitrogen and the fuel cell cycled back and forth between two potentials. For this test, initial fuel cell polarization curves and cyclic voltamograms were obtained for the two MEAs at 80° C. and fully humidified conditions. Ten thousand cyclic potential scans from 0.6 to 1.0 V (scan rate: 50 mV/sec) were applied to the MEAs at 80° C. and fully humidified conditions. Polarization and cyclic voltamogram were obtained after 1,000, 3,000 and 10,000 potential cycles. A fuel cell cathode prepared from non-aqueous NAFION™ dispersions show significantly less performance loss after potential cycles relative to the current state-of-the-art MEAs. Table 3 shows that this trend is evident in all three regions of the polarization curve (i.e. kinetic, ohmic, and mass transport), and provides an advantage regardless of the region in which the fuel cell will operate. FIG. 2 illustrates the losses observed after 1000, 3000, and 10,000 cycles for the MEA prepared from Example 5 (cathode prepared from non-aqueous Nafion™ dispersion) exhibited less performance degradation than the MEA prepared from comparative example 7 (cathode prepared from aqueous NAFION™ dispersion) during potential cycling.

TABLE 3

| | Voltage drop (V) during potential cycling. | | | | | | | | |
|---|---|---|---|---|---|---|---|---|---|
| | After 1000 cycles | | | After 3000 cycles | | | After 10,000 cycles | | |
| Cathode | 0.2 A/cm$^2$ | 1.0 A/cm$^2$ | 1.6 A/cm$^2$ | 0.2 A/cm$^2$ | 1.0 A/cm$^2$ | 1.6 A/cm$^2$ | 0.2 A/cm$^2$ | 1.0 A/cm$^2$ | 1.6 A/cm$^2$ |
| Example 3 | 0.001 | −0.005 | −0.016 | 0.009 | 0.007 | 0.027 | 0.014 | 0.018 | 0.056 |
| Comparative Example 2 | 0.016 | 0.019 | −0.016 | 0.022 | 0.030 | 0.026 | 0.042 | 0.057 | 0.154 |

\* 0.2 A/cm$^2$: kinetic region; 1.0 A/cm$^2$: ohmic region; and 1.6 A/cm$^2$: mass transport region.

Example 5 and comparative examples 5 and 6 explain the preparation of hydrocarbon-based sulfonic acid dispersion in non-aqueous, aqueous, and aprotic polar dispersing agents.

Example 5

21.57 g of alcohol, 0.54 g of hydrocarbon-based sulfonic acid (EW=580, 670 and 1550) with the functional groups having been hydrolyzed to SO$_3$Na form (solid content 2.5 wt. %), and the polymer itself being in the form of membrane having a thickness of about 50 micrometers, were placed in a 60 ml vial. The vial was heated in a convection oven at temperatures shown in Table 3. Table 4 shows the dispersion state after the heat treatment.

Comparative Example 5

64 g water, 96 g of isopropanol, 4 g of hydrocarbon-based sulfonic acid (EW=670) with the functional groups having been hydrolyzed to the SO$_3$Na form (solid content 2.5 wt. %), and the polymer itself being in the form of membrane having a thickness of about 50 micrometer, were placed in 200 ml closed vessel. The vessel was heated in a heat mantle at 120° C. for 3 hours. A clear liquid composition (transparent, uniform dispersion) was obtained without residual solid polymer after 12 hours of processing time.

Comparative Example 6

21.57 g of an aprotic polar solvent, 0.54 g of hydrocarbon-based sulfonic acid (EW=580, 670 and 1550) with the functional groups having been hydrolyzed to the SO$_3$Na form (solid content 2.5 wt. %), and the polymer itself being in the form of membrane having a thickness of about 50 micrometer), were placed in a 60 ml vial. The vial was heated in a convection oven the temperatures shown in Table 4. Table 4 shows the dispersion state after the heat treatment.

mixture is agitated with ultrasound to uniformly disperse the supported catalyst in the catalyst ink.

Comparative Example 7

A procedure similar to that of Example 6 was used except that 1 g of 2.5 wt. % NAFION™ 212 dispersion in water/isopropanol dispersion (prepared from Comparative example 5, (Table 4, No. 4-10)) was mixed with 0.0625 g Pt/C in a small vial.

A Na$^+$ NAFION™ membrane is provided by soaking a protonated membrane in a solution of 1 wt % NaOH, followed by rinsing and drying. The ink is applied to a Teflon transfer substrate by painting, and the substrate is baked in an oven at 140° C. The painting procedure is repeated until the catalyst loading reaches 0.14 mg/cm$^2$, and then further dried for at least 5 hours. For the anode catalyst layer, a catalyst ink prepared from comparative example 4 was used. For the cathode catalyst layer, catalyst inks prepared from Example 6 and comparative examples 7 were used. 1,5 pentanediol was painted onto the decal electrodes in order to increase surface adhesion with the NAFION™ membrane, as described in U.S. patent application Ser. No. 12/321,466, Kim et al. Hot press the Na$^+$form NAFION™ between anode and cathode catalyst layers at 150° C., 10000 kPa for 6 minutes. Cool the assembly and then peel the release blank from the MEA,

TABLE 4

Hydrocarbon membrane dispersion Na+ form

| No. | EW | Dispersing medium | Type of dispersion agent | Boiling point (° C.) | % solid | Processing temp./time (° C./hr) | Dispersion |
|---|---|---|---|---|---|---|---|
| 4-1 | 670 | 1,4 butanediol | Alcohol | 230 | 2.5 | 220/3 | − |
| 4-2 | 1519 | | | | | 220/3 | − |
| 4-3 | 670 | Ethylene glycol | Alcohol | 197 | 2.5 | 100/1 | + |
| 4-4 | 1519 | | | | | 190/3 | − |
| 4-5 | 670 | Propylene | Alcohol | 188 | 2.5 | 180/2 | + |
| 4-6 | 1519 | glycol | | | | 180/3 | − |
| 4-7 | 670 | glycerol | Alcohol | 290 | 2.5 | 170/1 | + |
| 4-8 | 1519 | | | | | 250/2 | + |
| 4-9 | 483 | | | | | 140/1 | + |
| 4-10 | 670 | Water/iso-propanol (1:1) | Water/alcohol | 100/82 | 2.5 | 80/12 | + |
| 4-11 | 670 | NMP | Aprotic polar | 203 | 2.5 | 30/3 | + |
| 4-12 | 1519 | | | | | 30/3 | + |
| 4-13 | 670 | DMSO | Aprotic polar | 189 | 2.5 | 30/3 | + |
| 4-14 | 1519 | | | | | 30/3 | + |
| 4-15 | 670 | DMAc | Aprotic polar | 165 | 2.5 | 30/3 | + |
| 4-16 | 1519 | | | | | 30/3 | + |

Example 6 and comparative example 7 show fuel cell performance of hydrocarbon-based electrodes. The electrodes were prepared from different hydrocarbon-based ionomer dispersions as described as Example 5. Polarization curves were obtained to evaluate the electrode performance.

Example 6

Catalyst dispersions for thin film electrodes are prepared by thoroughly mixing the catalyst (20 wt % Pt on carbon supplied by Alfa AISER) and the polymer dispersion.

The following procedure may be used:
1 g of 2.5 wt. % sulfonated poly(arylene ether) dispersion in glycerol (prepared from Table 4, No 4-7 and 4-9) was mixed with 0.0625 g Pt/C in a small vial. An amount of TBAOH equal to a molar equivalent of the ionomer is added to convert the ionomer to a thermoplastic TBA+ form. The leaving the electrode adhered to the membrane. Lightly boil the dried assembly in 0.5 M H$_2$SO$_4$ for 90 minute and rinse in boiling deionized water for 90 minute. Dry the assembly at 75° C. under vacuum.

Figure 3:
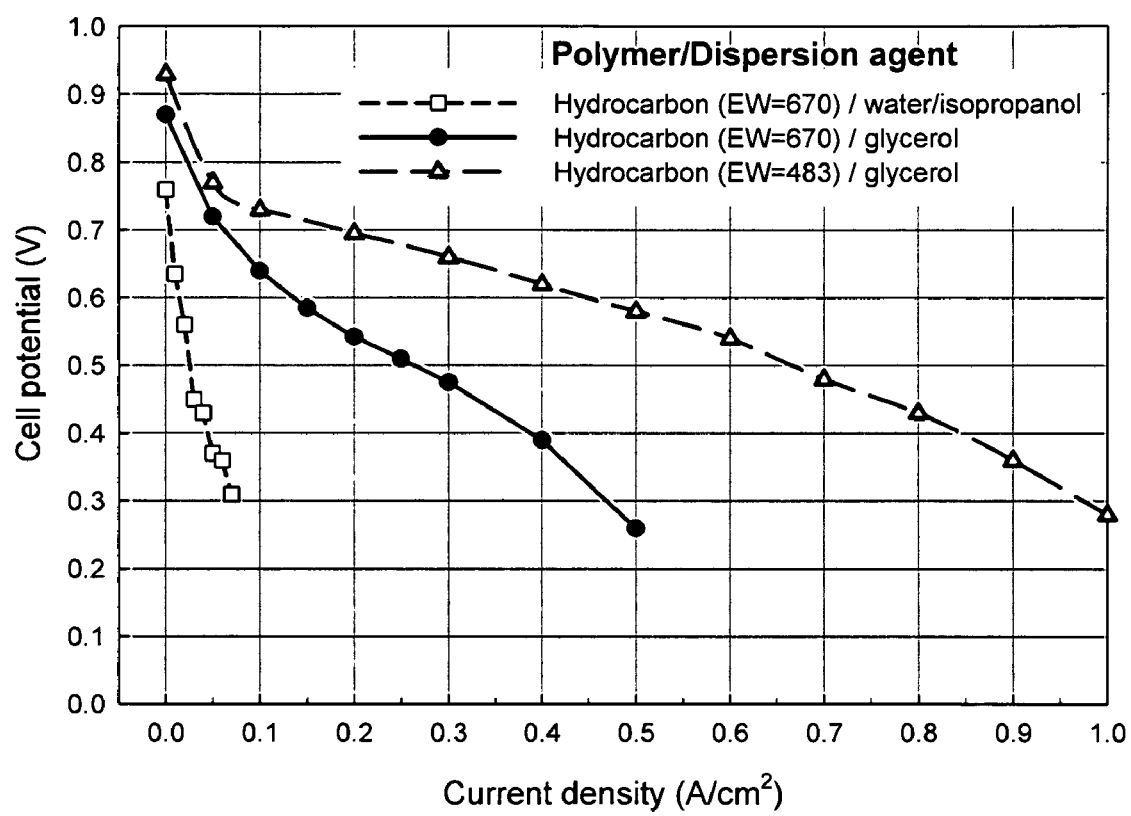
FIG. 3 depicts $H_2$/air fuel cell performance, as a function of cell potential in volts (y-axis) vs. current density in A/cm$^2$ (x-axis), of fuel cells having MEAs prepared from hydrocarbon-based ionomer dispersions in glycerol, where the ionomers have an EW of 483 and 670, respectively, and from a hydrocarbon-based ionomer dispersion in water/isopropanol, where the ionomer has an EW of 670. Membrane: NAFION™ 212, anode/cathode loadings are 0.2 mg Pt/cm$^2$ of 20 wt % Pt/C catalyst; anode/cathode pressures=30/30 psi, $T_{cell}$=80° C., anode/cathode $T_{humidifiers}$=105/80° C.

FIG. 3 graphically depicts the voltage vs. current density curves for fuel cells having a hydrocarbon-based polymer bonded electrode prepared from glycerol, and water/isopropanol. It is apparent that the electrode prepared from glycerol dispersion has better performance than the electrode prepared from water/isopropanol dispersion. This result indicates that fuel cell performance using glycerol dispersion is superior to water based dispersion.

Example 7 and comparative example 8 show the benefit of hydrocarbon-based ionomer over PFSA ionomer under high temperature and reduced relative humidity operating conditions. A hydrocarbon-based ionomer bonded electrode was prepared according to the procedure of Example 5.

Example 7

Fuel cell operation at high temperature and reduced relative humidity is desirable since it helps water management in the fuel cells. However, increasing temperature and decreasing relative humidity adversely impacts cell performance since membrane resistance increased due to dehydration. Utilizing a hydrocarbon bonded electrode is beneficial under high temperature and low relative humidity conditions relative to PFSA bonded electrode, since the significantly lower water transport can back-diffuse water from electrode to membrane. Example 7 and comparative example 8 exemplify one benefit of this invention, which describes making fuel cell electrodes using hydrocarbon-based ionomer.

Catalyst dispersions for thin film electrodes are prepared by thoroughly mixing the catalyst (20 wt % Pt on carbon supplied by Alfa AISER) and the polymer dispersion.

The following procedure may be used:

1 g of 2.5 wt. % sulfonated poly(arylene ether) dispersion in glycerol (prepared from Table 4, No. 4-7) was mixed with 0.0625 g Pt/C in a small vial. An amount of TBAOH equal to a molar equivalent of the ionomer is added to convert the ionomer to a thermoplastic TBA+ form. The mixture is agitated with ultrasound to uniformly disperse the supported catalyst in the catalyst ink.

Comparative Example 8

A procedure similar to that of Example 6 was used except that 1 g of 2.5 wt. % Nafion 212 dispersion in water/isopropanol dispersion (prepared from comparative example 1) was mixed with 0.0625 g Pt/C in a small vial.

Figure 4A:
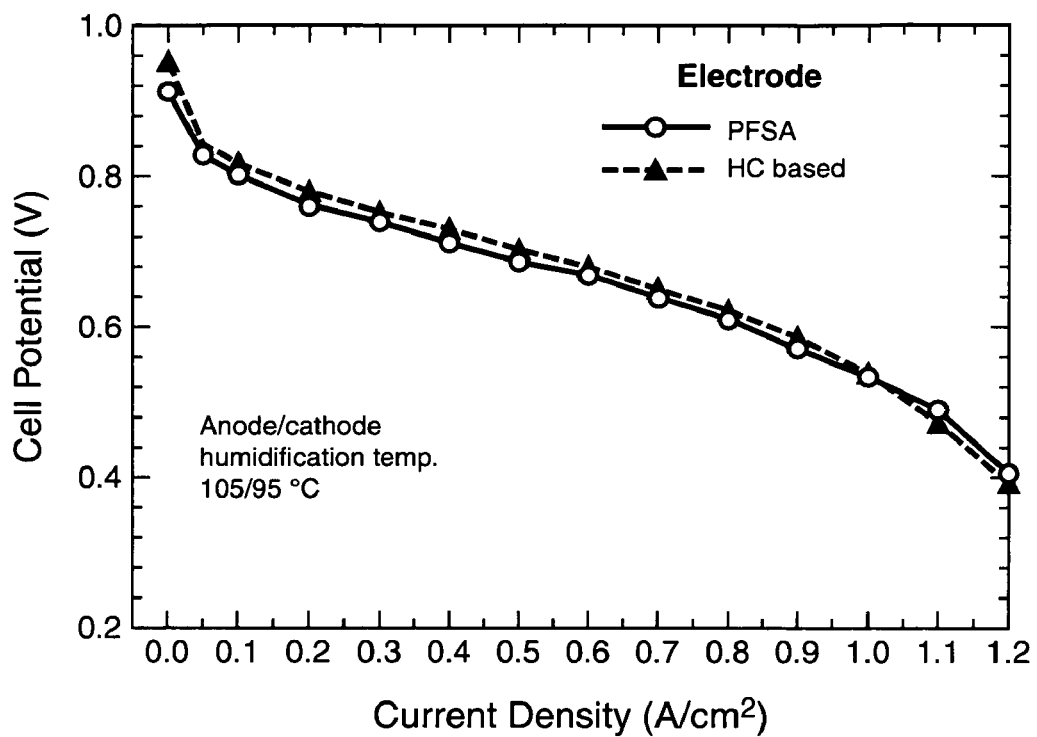
FIGS. 4(a) and 4(b) depict $H_2$/air fuel cell performance, as a function of cell potential in volts (y-axis) vs. current density in A/cm$^2$ (x-axis), of fuel cells having MEAs having PFSA and hydrocarbon-based bonded cathode catalysts. Membrane: NAFION™ 212, anode/cathode loadings are 0.2 mg Pt/cm$^2$ of 20 wt % Pt/C catalyst; anode/cathode pressures =20/20 psi, $T_{cell}$ =95° C. Anode/cathode humidification=(a) 105° C. saturated water vapor/95° C. saturated water vapor, (b) 105° C. saturated water vapor/no humidification, where "bypass" means air provided without passing through a humidity bottle.
Figure 4B:
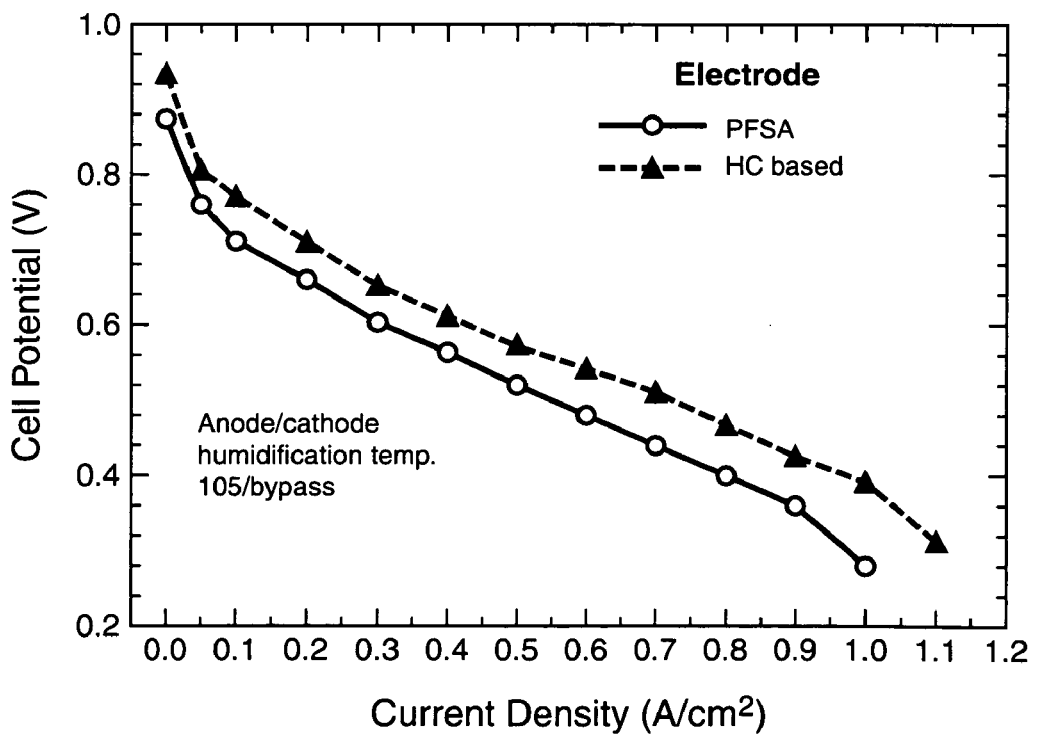

FIG. 4 shows the fuel cell performance of MEAs having PFSA and a hydrocarbon-bonded cathode catalyst at 95° C. Under fully saturated conditions, the fuel cell performance of MEAs having a hydrocarbon bonded cathode catalyst was equivalent to that of an MEA having a PFSA-bonded cathode catalyst. However, without cathode humidification, the MEA having the hydrocarbon-bonded cathode catalyst showed superior performance to the MEA having a PFSA-bonded cathode catalyst. This is thought to be due to the low water-permeable hydrocarbon-bonded cathode catalyst back-diffusing water to the anode side, which increases membrane hydration and lowers resistance. By utilizing a hydrocarbon-bonded electrode of the present invention, the water diffusion in the MEA is dramatically changed, which helps to improve fuel cell performance.

Whereas particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition consisting of:
    a) from about 1% to about 5% of a perfluorinated sulfonic acid ionomer;
    b) from about 95% to about 99% of a polyol solvent; and
    c) an electrocatalyst;
    wherein said composition is substantially free of water and wherein said ionomer is uniformly dispersed in said solvent.

2. The composition of claim 1, wherein said polyol is selected from the group consisting of glycerol, ethylene glycol, propylene glycol, a butanediol, a butanediol, a pentanetriol, a hexanetriol, and combinations thereof.

3. The composition of claim 2, wherein said polyol is glycerol.

4. The composition of claim 1, wherein said polyol is one of glycerol, ethylene glycol, propylene glycol, a butanediol, a butanetriol, a pentanetriol, or a hexanetriol.

5. The composition of claim 1, wherein the perfluorinated sulfonic acid ionomer is a salt, wherein the cation of the salt is selected from the group consisting of sodium, potassium, lithium, iron, cesium, magnesium, cesium, tetrabutyl ammonium, tetra methyl ammonium, tetrapropyl ammonium, tetraethyl ammonium, and combinations thereof.

6. The composition of claim 1, wherein the perfluorinated sulfonic acid ionomer is protonated.

7. The composition of claim 1, wherein the perfluorinated sulfonic acid ionomer has an equivalent weight of 1100 or less.

8. The composition of claim 1, wherein the electrocatalyst is comprises platinum or platinum on carbon.

* * * * *